United States Patent [19]

Takamatsu

[11] Patent Number: 4,896,830
[45] Date of Patent: Jan. 30, 1990

[54] WASTE HEAT RECOVERY SYSTEM FOR HORIZONTAL LIQUID-COOLED INTERNAL COMBUSTION ENGINE

[75] Inventor: Yoshimichi Takamatsu, Osaka, Japan

[73] Assignee: Kubota Ltd., Osaka, Japan

[21] Appl. No.: 255,162

[22] Filed: Sep. 29, 1988

[30] Foreign Application Priority Data

Sep. 30, 1987 [JP] Japan .................. 62-248264
Sep. 30, 1987 [JP] Japan .................. 62-248265

[51] Int. Cl.$^4$ ............................................. B60H 1/04
[52] U.S. Cl. ................................. 237/12.1; 123/41.31
[58] Field of Search .............. 123/41.01, 41.31, 41.51; 237/12.1, 13

[56] References Cited

U.S. PATENT DOCUMENTS

| | | | |
|---|---|---|---|
| 4,226,214 | 10/1980 | Palazzetti | 123/2 |
| 4,686,378 | 8/1987 | Sisk | 237/12.1 |
| 4,756,359 | 7/1988 | Greer | 237/12.1 |

FOREIGN PATENT DOCUMENTS 62-206260 9/1987 Japan .................. 237/12.1

Primary Examiner—Noah P. Kamen
Attorney, Agent, or Firm—Lowe, Price, Leblanc, Becker & Shur

[57] ABSTRACT

In a waste heat recovery system for a horizontal liquid-cooled internal combustion engine, the engine heat absorbed by the engine cooling liquid in a water jacket and the exhaust gas heat absorbed thereby in a heat exchanger for heat absorption from the exhaust gas (a first heat exchanger) are adapted to be recovered from the engine cooling liquid in a heat exchanger for waste heat recovery (a second heat exchanger). The first heat exchanger and the second heat exchanger are located on the upper side of the engine body of the internal combustion engine. And the engine cooling liquid outlet of the water jacket and the engine cooling liquid inlet of the first heat exchanger are communicated with each other directly, and the engine cooling liquid outlet of the first heat exchanger and the engine cooling liquid inlet of the second heat exchanger are communicated with each other directly.

6 Claims, 11 Drawing Sheets

WASTE HEAT RECOVERY SYSTEM FOR HORIZONTAL LIQUID-COOLED INTERNAL COMBUSTION ENGINE

BACKGROUND OF THE INVENTION

1. Field of the Invention

The present invention relates to a waste heat recovery system for a horizontal liquid-cooled internal combustion engine, in which the engine heat absorbed by engine cooling liquid in a water jacket and the exhaust gas heat absorbed thereby in a heat exchanger for heat absorption from the exhaust gas are adapted to be recovered from the engine cooling liquid by the radiation performed in a heat exchanger for waste heat recovery.

As for such a conventional waste heat recovery system for a liquid-cooled internal combustion engine, so far has been known the one disclosed in U.S. Pat. No. 4,226,214.

The conventional system is provided with a heat exchanger for heat absorption from the exhaust gas (a first heat exchanger) and a heat exchanger for waste heat recovery (a second heat exchanger) both of which are connected in series to a water jacket within an engine body so that the engine cooling liquid can circulate in order through the water jacket, the first heat exchanger and then the second heat exchanger. Therefore, the engine cooling liquid which absorbs the heat in the water jacket also is adapted to absorb the exhaust gas heat during flowing through the first heat exchanger to reach a high temperature and then to radiate the heat retained therein to an external thermal load such a hot-water reservoir and the like through the second heat exchanger.

In this prior art, for accomplishing a concrete waste heat recovery system, the internal combustion engine is of a vertical type, and the first heat exchanger for heat absorption from the exhaust gas and the second heat exchanger for waste heat recovery are disposed separately each other a a predetermined distance in a lateral space beside the engine body thereof. And the cooling liquid outlet of the water jacket and the engine cooling liquid inlet of the first heat exchanger, the engine cooling liquid outlet of the first heat exchanger and the engine cooling liquid inlet of the second heat exchanger, and the engine cooling liquid outlet of the second heat exchanger and the engine cooling liquid inlet of the water jacket are connected respectively by pipes for the conduction of the engine cooling liquid.

There are following problems associated with the above-mentioned prior art.

(A) A large area is required for providing the waste heat recovery system because the first heat exchanger and the second heat exchanger are arranged in the lateral space beside the engine.

(B) Since it is necessary to provide the pipes for the conduction of the engine cooling liquid at three locations, further there are following problems.

(1) The arrangement of piping is complicated and requires much labor for assembly of the pipes.
(2) The space required for the piping gets larger, and accordingly the whole of the waste heat recovery system becomes larger.
(3) Large heat radiation losses are caused by the pipes, and the efficiency of the waste heat recovery gets worse correspondingly.

SUMMARY OF THE INVENTION

The present invention is directed to solving the problems noted above and resides in the following improvements of the concrete construction of the above-mentioned waste heat recovery system.

That is, an internal combustion engine is defined as a horizontal one, the first heat exchanger for hear absorption from the exhaust gas and the second heat exchanger for waste heat recovery are located on the engine body of the horizontal internal combustion engine, the engine cooling liquid inlet of the first heat exchanger is connected directly to the engine cooling liquid outlet of the water jacket, and the engine cooling liquid inlet of the second heat exchanger is connected directly to the engine cooling liquid outlet of the first heat exchanger. Thereby, the pipes for the conduction of the engine cooling liquid are eliminated at the two locations, namely between the water jacket and the first heat exchanger and between the first heat exchanger and the second heat exchanger.

Accordingly. since the present invention is constructed as mentioned above, the following advantages associated therewith can be attained.

(A) Since the first heat exchanger and the second heat exchanger are located on the upper side of the engine body of the horizontal engine, an area only for the provision of these first and second heat exchangers can be eliminated and an area for the provision of the whole waste heat recovery system can be reduced.

(B) Further, there are following advantages associated with the pipings for the waste heat recovery system.

(1) Since the piping for the conduction of the engine cooling liquid is required only between the first heat exchanger and the water jacket, the arrangement of piping can be simplified remarkably. Therefore, the assembly work of the pipes can be carried out readily, and the manufacturing cost of the waste heat recovery system can be reduced.

(2) Since the locations of providing the pipes for the conduction of the engine cooling liquid are decreased in number remarkably, the piping space can be made smaller so that the whole of the waste heat recovery system can be constructed in a smaller size.

(3) Since the heat radiation loss caused by the pipes becomes less due to the decrease of the piping locations for the conduction of the engine cooling liquid, the efficiency of the waste heat recovery in the waste heat recovery system can be improved.

By the way, since the first heat exchanger is adapted to facilitate the heat exchange between the exhaust gas delivered from the internal combustion engine and the engine cooling liquid therein so that the temperature of the exhaust gas can be lowered sufficiently, a muffler of smaller size can be adopted functionally. In the case that the small muffler is arranged side by side beside the first heat exchanger and the second heat exchanger above the engine body, these muffler, first heat exchanger and second heat exchanger are restrained from projecting from a rectangular space for the engine body so that the whole of the waste heat recovery system can be made a lot smaller.

BRIEF DESCRIPTION OF THE DRAWINGS

The present invention will be described in greater detail by reference to the following description taken in connection with the accompanying drawings, in which:

FIG. 1 through FIG. 6 show the first embodiment;

FIG. 1 is a schematic perspective view showing an engine generator provided with a waste heat recovery system;

FIG. 2 is a systemic view showing the whole of the waste heat recovery system;

FIG. 3 is a vertical sectional front view showing the engine generator;

FIG. 4 is a plan view showing an internal combustion engine and a partial sectional view on IV—IV line in FIG. 3;

FIG. 5 is a left side view showing the same and a partial sectional view on V—V line in FIG. 3;

FIG. 6 is an enlarged sectional view showing a flow passage in a first heat exchanger for heat absorption from the exhaust gas and a partial sectional view on VI—VI line in FIG. 5;

FIG. 7 through FIG. 9 show the second embodiment;

FIG. 7 is a partial view corresponding to FIG. 3;

FIG. 8 is a view corresponding to FIG. 4;

FIG. 9 is a view corresponding to FIG. 5;

FIG. 10 shows the third embodiment and is a view corresponding to FIG. 4;

FIG. 11 through FIG. 13 show the fourth embodiment;

FIG. 11 is a partial view corresponding to FIG. 3;

FIG. 12 is a view corresponding to FIG. 4;

FIG. 13 is a view corresponding to FIG. 5;

FIG. 14 through FIG. 16 show the fifth embodiment;

FIG. 14 is a view corresponding to FIG. 7;

FIG. 15 is a view corresponding to FIG. 8;

FIG. 16 is a view corresponding to FIG. 9;

FIG. 17 through FIG. 18 show the sixth embodiment;

FIG. 17 is a back view showing the internal combustion engine and a partial view corresponding to FIG. 3;

FIG. 18 is a view on XVIII—XVIII line in FIG. 17;

FIG. 19 through FIG. 21 show a variant example of the sixth embodiment;

FIG. 19 is a view showing a state wherein the first heat exchanger is fixedly secured on the upper surface of the engine body of the internal combustion engine;

FIG. 20 is a view on XX—XX line in FIG. 19; and

FIG. 21 is a sectional view on XXI—XXI line in FIG. 20.

DETAILED DESCRIPTION OF THE PREFERRED EMBODIMENTS

[First Embodiment]

FIGS. 1 through 6 show the first embodiment in which a waste heat recovery system is assembled in an internal combustion engine for an engine generator.

Figure 1:
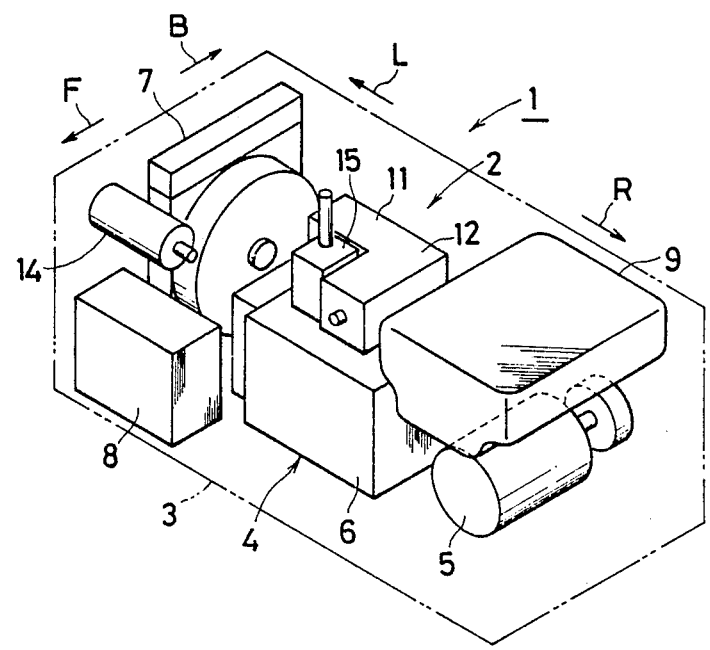
FIG. 1 through FIG. 21 are views showing the embodiments of the present invention.

First of all, with reference to a perspective view of FIG. 1, a schematic arrangement of an engine generator 1 and a waste heat recovery system 2 will be explained hereinafter. The arrow of F shows the front side of the engine generator 1, the arrow of B does not back side thereof, the arrow of L does the left side thereof, and the arrow of R does the right side thereof respectively.

In the interior space within a soundproof casing 3 having a configuration of a rectangular prism, there are provided a horizontal liquid-cooled Diesel engine (an internal combustion engine) 4 and a generator 5 disposed left side by right side respectively. A radiator 7 is arranged at the left side with respect to the engine body 6 of the Diesel engine 4, and a battery 8 is arranged at the front side with respect to the radiator 7. The battery 8 is adapted to accumulate a portion of the output power generated by the generator 5 so as to serve to start the operation of the engine body 6. In the upper space above the generator 5, there is provided a fuel tank 9. Further, a heat exchanger for heat absorption from the exhaust gas (a first heat exchanger) 11 and a heat exchanger for waste heat recovery (a second heat exchanger) 12 of the waste heat recovery system 2 are located on the upper side of the engine body 6. And, an air cleaner 14 of the Diesel engine 4 is located above the battery 8, and a muffler 15 is located on the upper side of the engine body 6 at nearly the same height as the first heat exchanger 11 and the second heat exchanger 12.

Figure 2:
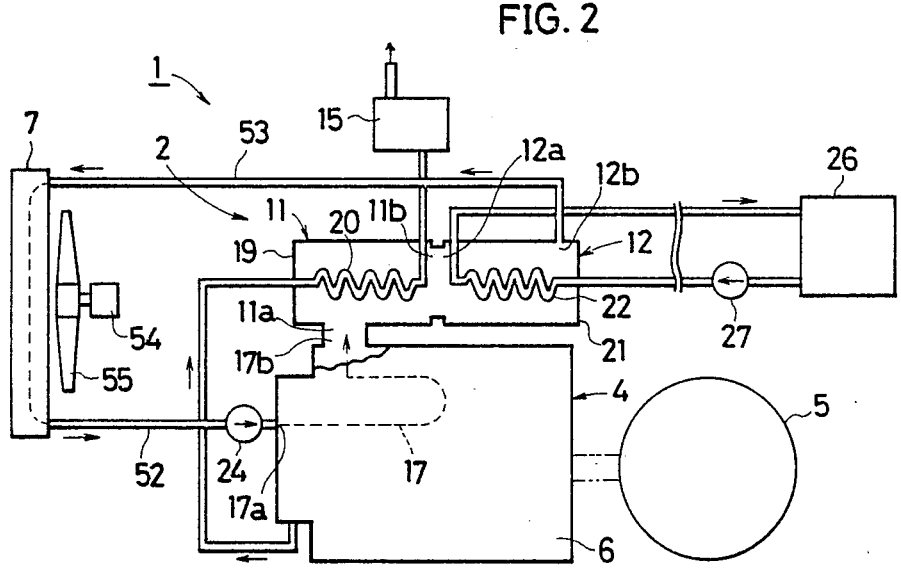

Then, the basic construction of the waste heat recovery system 2 will be explained with reference to the system shown in FIG. 2 hereinafter.

The waste heat recovery system 2 is adapted to absorb the waste heat generated in the Diesel engine 4 in the water jacket 17 as well as in the first heat exchanger 11 through the engine cooling liquid and to recover the waste heat in the second heat exchanger 12 therethrough.

The first heat exchanger 11 has an exhaust gas passage 20 provided within a first shell 19 for the conduction of the engine cooling liquid. The second heat exchanger 12 has a heat liquid-medium passage 22 provided for the heat recovery within a second shell 21 for the conduction of the engine cooling liquid. The engine cooling liquid for the Diesel engine 4 is adapted to be returned from the engine cooling liquid outlet 17b of the water jacket 17 to the engine cooling liquid inlet 17a of the water jacket 17 through the inlet 11a and the outlet 11b of the first heat exchanger 11 for the engine cooling liquid, the inlet 12a and the outlet 12b of the second heat exchanger 12 for the engine cooling liquid, the radiator 7 and an engine cooling liquid circulation pump 24 in order. On the other hand, the exhaust gas delivered from the engine body 6 is adapted to be discharged from the muffler 15 to the open air through the exhaust gas passage 20 of the first heat exchanger 11. And the heat liquid-medium within external loads 26 such as a feed hot-water system, a cooling-heating air conditioning system and the like is adapted to be supplied to the heat liquid-medium passage 22 of the second heat exchanger 12 by a heat liquid-medium circulation pump 27.

Thereby, the engine cooling liquid heated in the water jacket 17 absorbs the heat from the exhaust gas in the first heat exchanger 11 to increase its temperature, transfers the heat to the heat liquid-medium for the waste heat recovery by means of the radiation in the second heat exchanger 12, then further carries out the radiation in the radiator 7 and returns to the water jacket 17.

The concrete constructions of the engine generator 1 and the waste heat recovery system 2 will be explained with reference to FIGS. 3 through 6 hereinafter.

A common base 30 is supported on the bottom wall 3a of the soundproof casing 3 through a plurality of vibration isolating rubbers 29. The Diesel engine 4 and the generator 5 are arranged left side by right side respectively on the common base 30. The output shaft 4a projected backward from the Diesel engine 4 and the input shaft 5a of the generator 5 are operatively interlocked by a belt type transmission gear 31. The fuel tank 9 is supported by the ceiling wall 3b of the soundproof casing 3.

In the first place, the Diesel engine 4 will be explained. It is a horizontal two-cylinder type engine. The engine body 6 comprises a crankcase 32, a cylinder block 33 integrally formed with the crankcase 32, a cylinder head 34 and a head cover 35 both of which are secured in order on the left side of the cylinder block 33. A cylinder jacket within the cylinder block 33 and a head jacket within the cylinder head 34 form the water jacket 17 associatively. And a gear casing 37 is provided on the front side of the crankcase 32 in a projecting manner. Fuel injection pumps 38 provided in the left portion of the gear casing 37 are connected to fuel injectors 39 provided in the upper porton of the cylinder head 34. Further, a starter motor 40 is arranged in the upper right portion of the crankcase 32.

The cylinder head 34 is equipped with an intake manifold 42 on the upper side thereof 34 and with an exhaust manifold 43 on the lower side thereof 34. The intake manifold 42 is connected to the air cleaner 14 through an intake pipe 44. The exhaust manifold 43 is connected to the muffler 15 through an exhaust pipe 45. An outlet pipe 15b of the muffler 15 projects outward through the ceiling wall 3b of the soundproof casing 3.

And the engine cooling liquid circulation pump 24 is fixedly secured on the back wall of the cylinder head 34, and a pump input pulley 49 provided on the back side of the pump casing 48 thereof 24 is operatively interlocked to an output shaft 4a of the Diesel engine 4 through a transmission belt 50. A lug having a pump delivery outlet 48a is provided on the pump casing 48 in a projecting manner toward right side. The lug having the pump delivery outlet 48a is fixedly secured to the back wall of the cylinder head 34 so that the outlet 48a directly communicates with the engine cooling liquid inlet 17a of the water jacket 17. And a pump suction nozzle 48b protruded leftward downward from the pump casing 48 is connected to a lower tank 7a of the radiator 7 through a flexible cool water pipe 52. Further, the engine cooling liquid outlet 12b of the second heat exchanger 12 is connected to an upper tank 7b of the radiator 7 through a flexible hot water pipe 53. The radiator 7 is equipped with a cooling fan 55 which is driven by an electric motor 54.

Next, the first heat exchanger 11 and the second heat exchanger 12 will be explained.

The first heat exchanger 11 is of a plate type, in which a large number of box-shaped plates 57 are stacked in a vertical direction with keeping a predetermined distance therebetween within the first shell 19 for the conduction of the engine cooling liquid.

The space between the first shell 19 and the respective box-shaped plates 57 provide the passage for the engine cooling liquid. That is, the bottom wall of the first shell 19 is fixedly secured onto the upper surface of the cylinder block 33 so that the engine cooling liquid inlet 11a of the first heat exchanger 11 can directly communicates with the engine cooling liquid outlet 17b of the water jacket, which outlet 17b being opened in the upper surface of the cylinder block 33.

Figure 6:
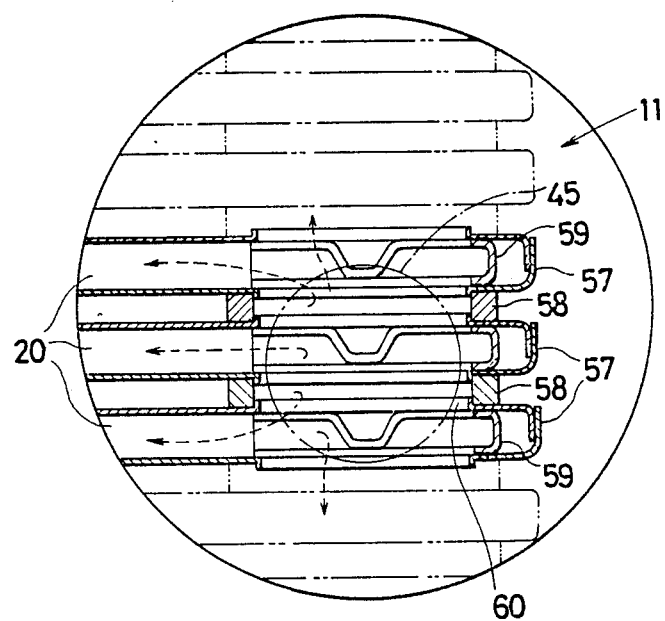

And the interior spaces of the box-shaped plates 57 provide the exhaust gas passage 20. That is, as shown in FIG. 6, annular outer spacers 58 and inner spacers 59 are mounted in the left portions of the stacked box-shaped plates 57 so that the interior spaces of the outer spacers 58 provide a header 60 at the exhaust gas inlet side, which extends vertically. Similarly, another header 61 at the exhaust gas outlet side is provided in the right portions of the box-shaped plates 57 so as to extend vertically. The header 60 at the exhaust gas inlet side is connected to an exhaust gas pipe 45, and the header 61 at the exhaust gas outlet side is connected to an inlet pipe 15a of the muffler 15.

On the other hand, the second heat exchanger 12 is of a shell and tube type, in which a large number of heat exchanging tubes 62 are provided within the second shell 21 for the engine cooling liquid in such a manner as extending in the fore and back direction. The interior spaces of these tubes 62 provide the heat liquid-medium passage 22 for the waste heat recovery.

The first shell 19 of the first heat exchanger 11 and the second shell 21 of the second heat exchanger 12 are formed integrally in a L-shaped configuration in plan view by one casing 63 for the conduction of the engine cooling liquid. Thereby, the engine cooling liquid outlet 11b of the first heat exchanger 11 communicates directly with the engine cooling inlet 12a of the second heat exchanger 12. And the muffler 15 is located in the space bounded by the corner portions of the casing 63 for the conduction of the engine cooling liquid.

FIGS. 7 through 21 show other embodiments, in which different arrangements from the above-mentioned one will be explained respectively. By the way, the component parts having the same funcions as ones of the above-mentioned embodiment are designated by the same symbols.

[Second Embodiment]

Figure 8:
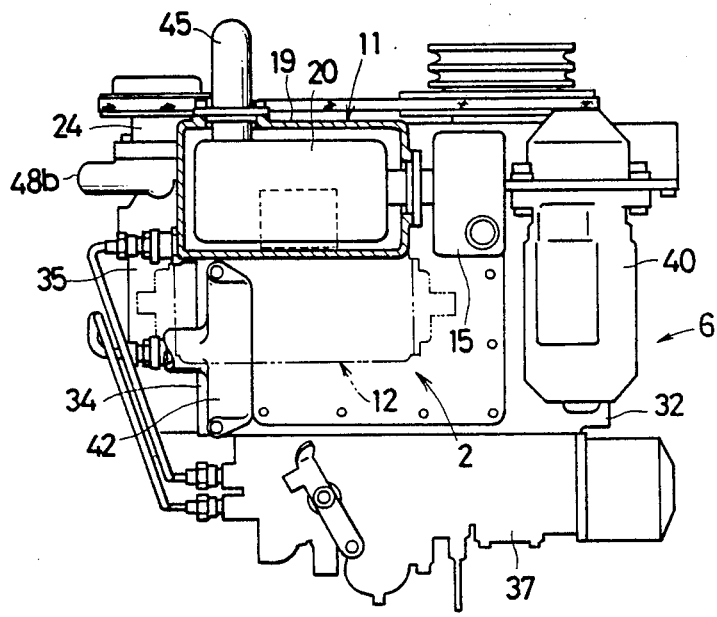
Figure 7:
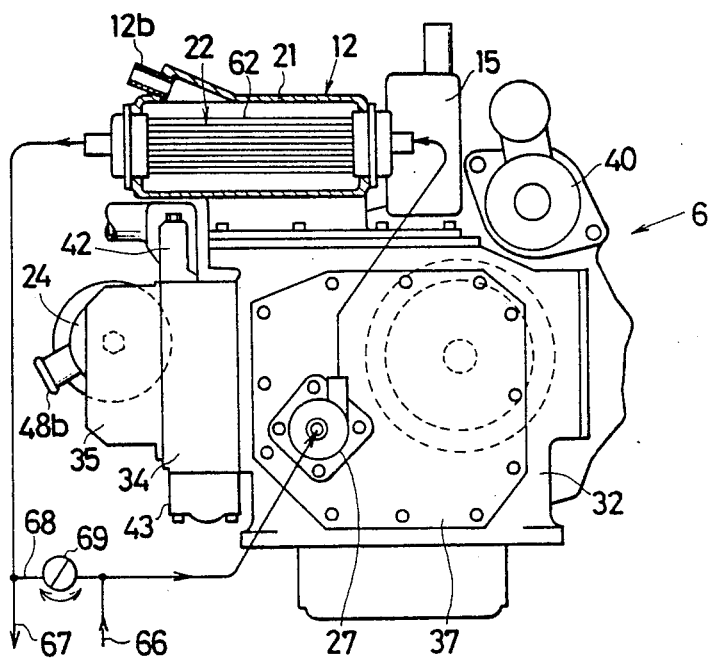
Figure 9:
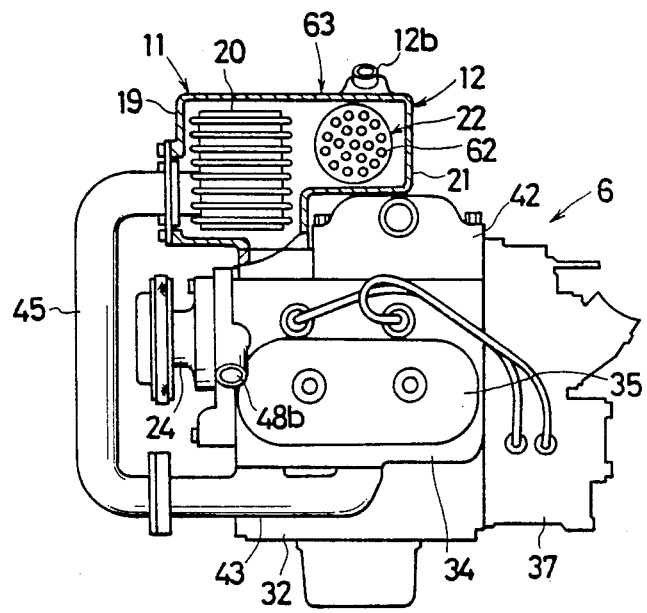

FIGS. 7 through 9 show the second embodiment.

The second shell 21 of the second heat exchanger 12 is protruded integrally from the front upper portion of the first shell 19 of the first heat exchanger 11. The heat exchanging tube 19 of the first heat exchanger 11. The heat exchanging tube 62 are provided within the second shell 21 in such a manner as extending in the left and right direction. The muffler 15 is located between the first heat exchanger 11 and the starter motor 40.

And the heat liquid-medium circulation pump 27 is mounted on the front wall of the gear casing 37. The circulation pump 27 is adapted to be driven by a driving shaft (not illustrated) which projects through the gear casing 37.

Further, a heat liquid-medium feed pipe line 66 is connected to a heat liquid-medium discharge pipe line 67 by a bypass pipe line 68 which has a changeover valve 69 interposed therein. Thereby, when it is not required to perform the waste heat recovery because the temperature of the heat liquid-medium is sufficiently high, the temperature of the external load 26 can be prevented from being increased to excess by the opening of the changeover valve 69, namely by the circulation of the heat liquid-medium through the circuit comprising the pump 27, the second heat exchanger 12 and the changeover valve 69.

[Third Embodiment]

Figure 10:
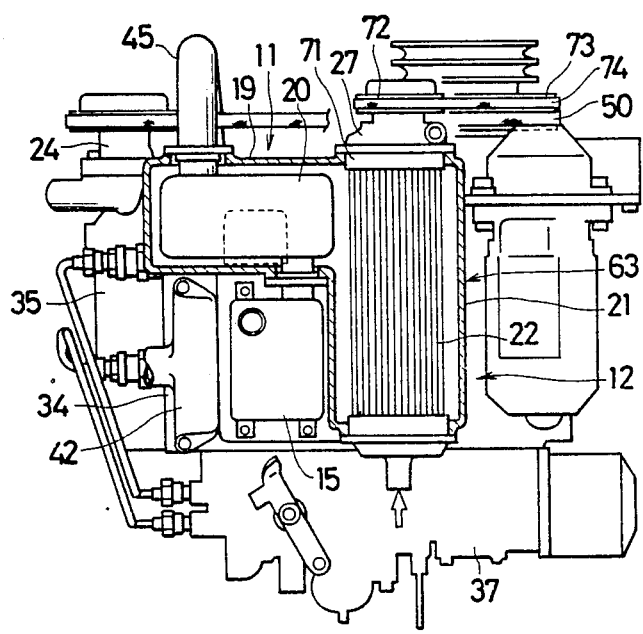

FIG. 10 shows the third embodiment.

Figure 4:
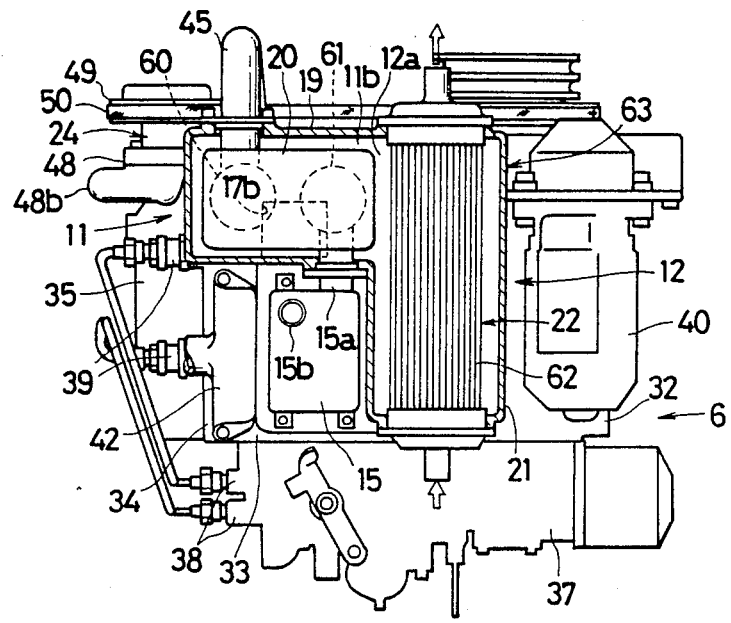

The casing 63 for the conduction of the engine cooling liquid is formed in a L-shaped configuration the same as the one of the first embodiment (refer to FIG. 4). The heat liquid-medium circulation pump 27 is fixedly secured at the suction side thereof onto the header 71 at the heat liquid-medium outlet side of the second heat exchanger 12. The input pulley 72 of the circulation pump 27 is operatively interlocked with the pump driving pulley 73 through the transmission belt 74. The transmission belt 74 is provided in that way behind the transmission belt 50 for driving the engine cooling liquid circulation pump 24.

[Fourth Embodiment]

Figure 3:
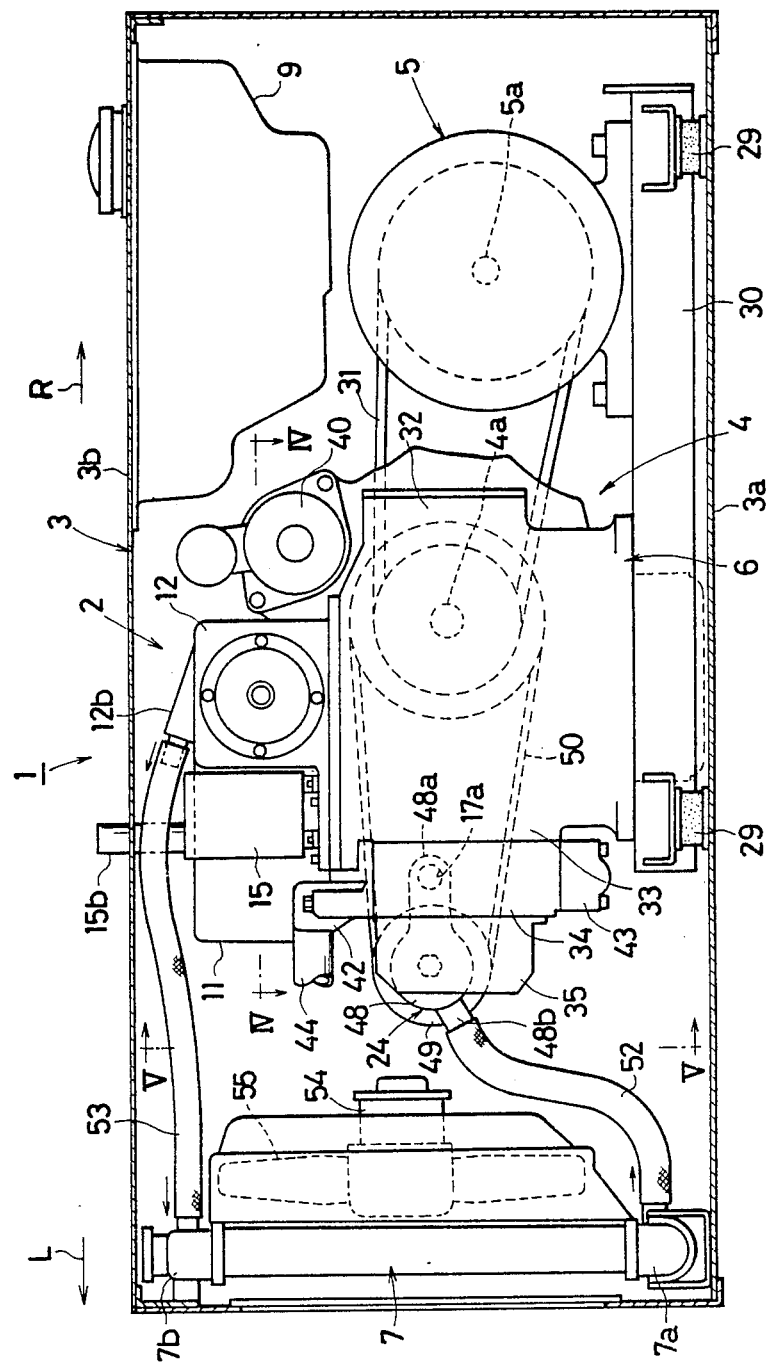
Figure 5:
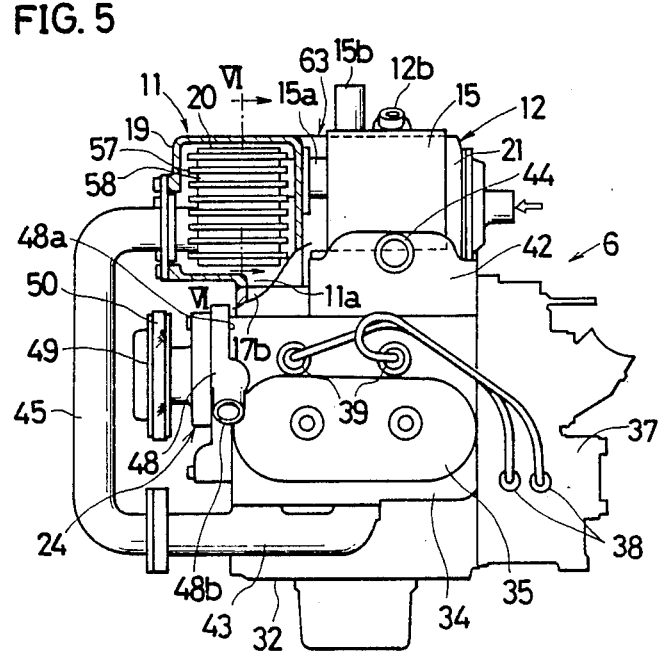
Figure 12:
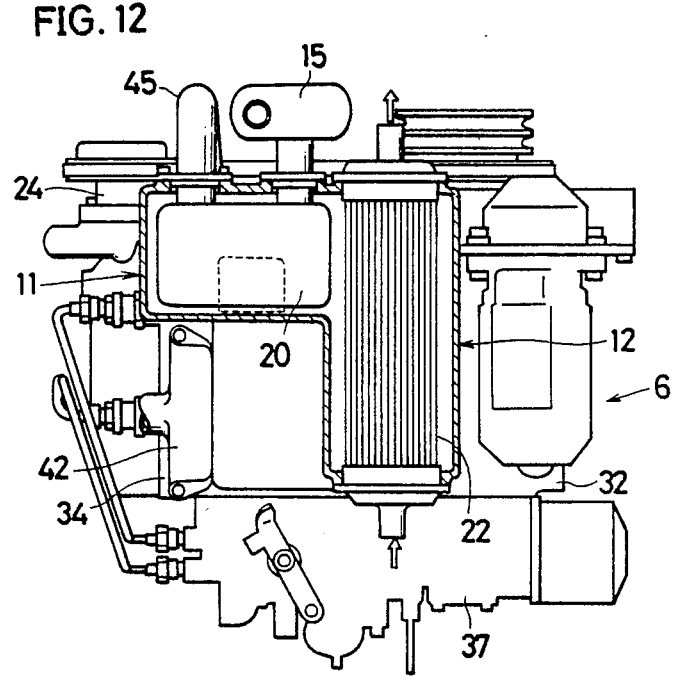
Figure 11:
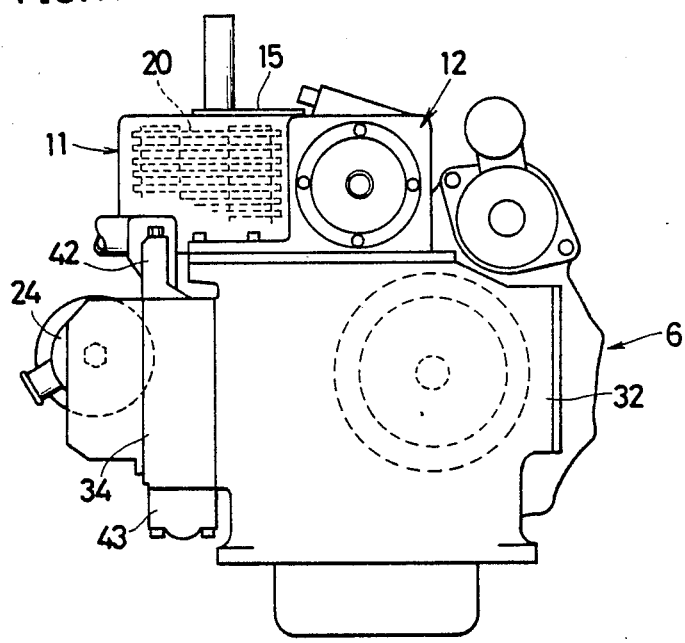
Figure 13:
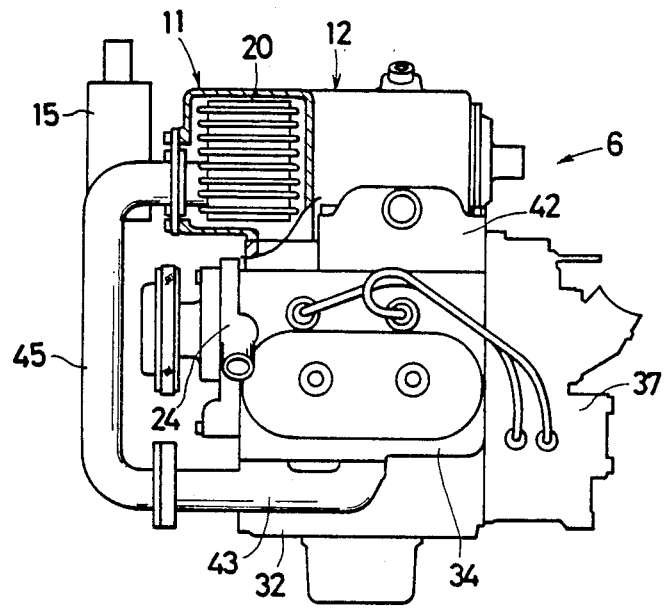

FIGS. 11 through 13 show the fourth embodiment and are views corresponding to FIG. 3, FIG. 4 and FIG. 5 of the first embodiment respectively. As an arrangement different from the first embodiment in this fourth embodiment, the muffler 15 is located behind the heat exchanger for heat absorption from the exhaust gas (the first heat exchanger) 11.

[Fifth Embodiment]

Figure 16:
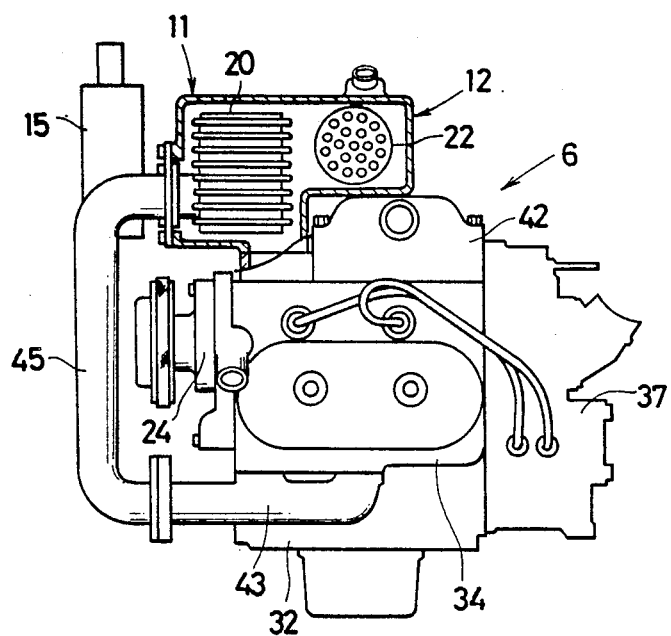
Figure 15:
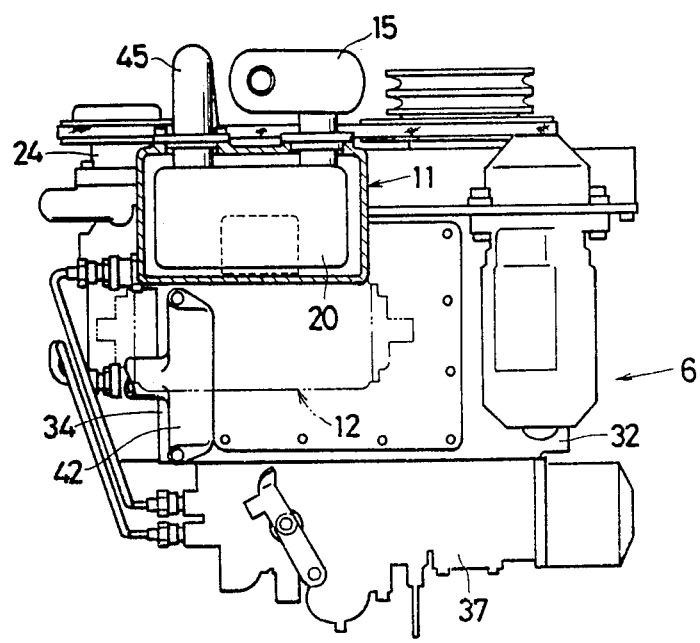
Figure 14:
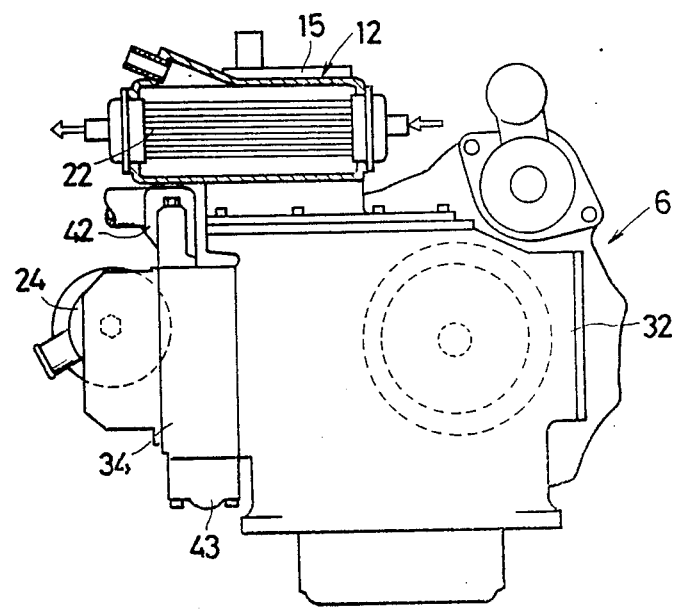

FIGS. 14 through 16 show the fifth embodiment and are views corresponding to FIG. 7, FIG. 8 and FIG. 9 of the second embodiment respectively. As an arrangement different from the second embodiment in this fifth embodiment, the muffler 15 is located behind the heat exchanger for heat absorption from the exhaust gas (the first heat exchanger) 11.

[Sixth Embodiment]

Figure 18:
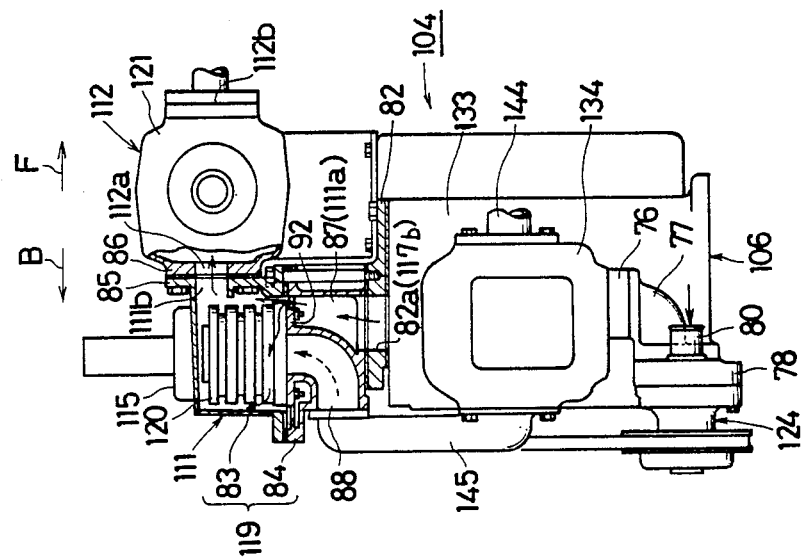
Figure 17:
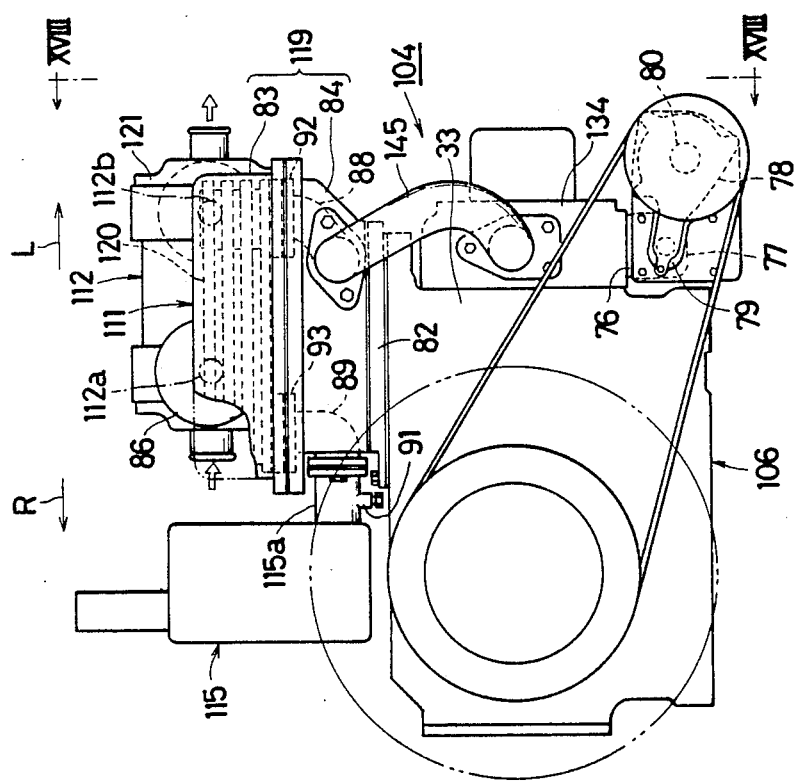

FIGS. 17 and 18 show the sixth embodiment.

FIG. 17 is a back view of the internal combustion engine 4, and FIG. 18 is a partial sectional view on XVIII—XVIII line in FIG. 17.

In this case, an engine body 106 of a Diesel engine 104 is of a single-cylinder type, in which an intake pipe 144 is connected to the front side of a cylinder head 134, and an exhaust pipe 145 is connected to the back side of the cylinder head 134. And an engine cooling liquid inlet nozzle 76 for the water jacket is provided on the underside of the cylinder heat 134.

A pump delivery port 79 provided in a pump casing 78 of an engine cooling liquid circulation pump 124 is connected to the engine cooling liquid inlet nozzle 76 through an elbow 77. A pump suction nozzle 80 of the pump casing 78 is formed in such a manner as projecting forward.

And an engine cooling liquid outlet 117b of the water jacket is defined by an outlet port 82a of a jacket cover 82 which is fixedly secured on the upper surface of the cylinder block 133.

A heat exchanger for heat absorption from the exhaust gas 111, a heat exchanger for waste heat recovery 112 and a muffler 115 are located on the upper surface of the engine body 106 constructed as mentioned above.

A first shell 119 for the conduction of the engine cooling liquid in the first heat exchanger 111 comprises a shell body 83 and a bottom frame 84 removably attached to the underside of the shell body 83. The first shell 119 and a second shell 121 for the conduction of the engine cooling liquid in the second heat exchanger 112 are formed separately. And an engine cooling liquid outlet flange 85 protruded forward from the shell body 83 of the first shell 119 and an engine cooling liquid inlet flange 86 protruded backward from the second shell 121 are connected to each other. Thereby, the engine cooling liquid outlet 111b of the first heat exchanger 111 and the engine cooling liquid inlet 112a of the second heat exchanger 112 are communicated directly with each other.

In the bottom frame 84 of the first heat exchanger 111, there are arranged an engine cooling liquid inlet passage 87, an exhaust gas inlet passage 88 and an exhaust gas outlet passage 89. An engine cooling liquid inlet 111a of the first heat exchanger 111 is defined by the engine cooling liquid inlet passage 87. An exhaust gas inlet and an exhaust gas outlet of the first heat exchanger 111 are defined by the exhaust gas inlet passage 88 and the exhaust gas outlet passage 89 respectively. The exhaust gas inlet passage 88 and the exhaust gas outlet passage 89 are curved respectively in transverse and vertical directions, namely in L-shaped configurations so as to communicate with an exhaust gas passage 120 for the plate type heat exchange provided within the shell body 83. Further, the exhaust gas inlet passage 88 is connected to the exhaust pipe 145, and the exhaust gas outlet passage 89 is connected to the inlet pipe 115a of the muffler 115. The lower portion of the inlet pipe 115a of the muffler 115 is provided with a drain port 91 for the removal of exhaust gas condensate. By the way, the top ends of the exhaust gas inlet passage 88 and the exhaust gas outlet passage 89 are provided with an inlet flange 92 and an outlet flange 93 respectively so that the exhaust gas inlet portion and the exhaust gas outlet portion of th exhaust gas passage 120 for the heat exchange are respectively connected detachably to the flanges 92, 93 by means of screws.

As mentioned above, since the exhaust gas inlet passage 88 and the exhaust gas outlet passage 89 are provided in such a manner as extending downward from the lower portion of the exhaust gas passage 120 for the plate type heat exchange, the exhaust gas condensate which is produced on the interior surface of the exhaust gas passage 120 by the cooling down of the exhaust gas therein is adapted to be discharged smoothly from the interior of the the exhaust passage 120 through the exhaust gas outlet passage 89 by the flowing movement of the exhaust gas so as to be prevented from accumulating in the lower portion of the exhaust gas passage 120. Therefore, the exhaust gas passage 120 can be prevented from being corroded so as to extend its service life.

Figure 20:
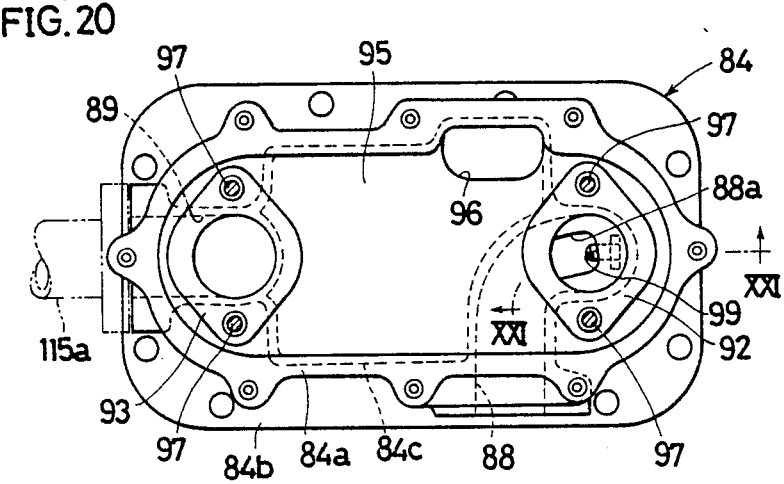
Figure 19:
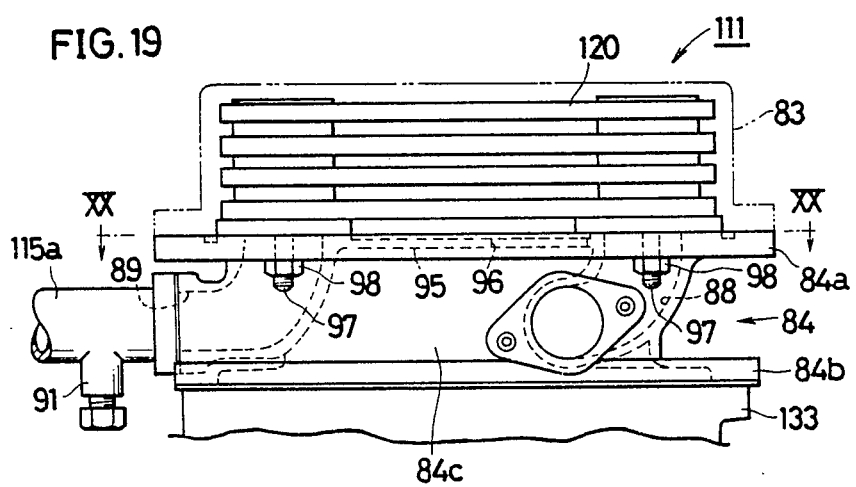
Figure 21:
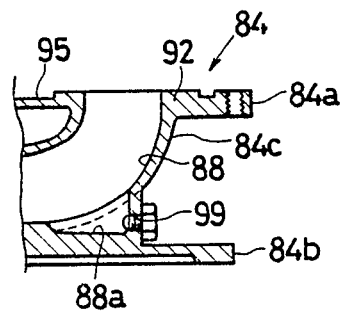

FIGS. 19 through 21 show a variant example of the bottom frame 84 of the first heat exchanger 111 in the sixth embodiment so as to disclose the construction of the bottom frame 84 more concretely. As an arrangement different from the sixth embodiment in this variant example, the jacket cover 82 is eliminated by the direction attachment of the bottom frame 84 to the upper surface of the cylinder block 133. FIG. 19 is a view showing the condition of the first heat exchanger 111 fixedly secured to the cylinder block 133, FIG. 20 is a view on XX—XX line in FIG. 20, and FIG. 21 is a sectional view on XXI—XXI line in FIG. 20.

The bottom frame 84 of the first heat exchanger 111 comprises an upper flange 84a, a lower flange 84b and a cylindrical peripheral wall 84c which connects them 84a, 84b. And the upper flange 84a is provided with a ceiling wall 95. The space surrounded by the ceiling wall 95 and the peripheral wall 84c and the interior space of the shell body 83 are communicated with each other through a communication hole 96. The elbow-shaped exhaust gas inlet passage 88 and the elbow-shaped exhaust gas outlet passage 89 are extended in transverse vertical directions fromthe ceiling wall 95. The top ends of the exhaust gas inlet passage 88 and the exhaust gas outlet passage 89 are provided with the inlet flange 92 and the outlet flange 93 at nearly the same height as the upper flange 84a. Four pieces of tie-rods 97 are provided for the connection of the exhaust gas passage 120 of the plate type and in such a manner as passing through the opposite lateral ends of each flange 92, 93. And the lower portions of the tie-rods 97 are threadably engaged with nuts 98 to tighten.

Similarly, the drain hole 91 is provided in the lower portion of the muffler inlet pipe 115a for the removal of the exhaust gas condensate. Further, there is provided a reservoir groove 88a for the exhaust gas condensate at the bottom of the exhaust gas inlet passage 88. The reservoir groove 88a is provided with a drain port 99 for the removal of the exhaust gas condensate.

By the way, the Diesel engine adopted as the internal combustion engine in the respective embodiments may be replaced with a gasoline engine or a gas engine, instead.

And in case that the engine cooling liquid can be cooled sufficiently owing to a large heat recovering capacity of the second heat exchanger 12, the radiator 7 may be eliminated.

What is claimed is:

1. In a waste heat recovery system for a horizontal liquid-cooled internal combustion engine;

said horizontal liquid-cooled internal combustion engine being equipped with a heat exchanger for heat absorption from the exhaust gas (a first heat exchanger) and a heat exchanger for waste heat recovery (a second heat exchanger), a water jacket within an engine body of said internal combustion engine, the first heat exchanger and the second heat exchanger being connected in series so that the engine cooling liquid will circulate in order through the water jacket, the first heat exchanger and the second heat exchanger, waste heat generated from the internal combustion engine being adapted to be absorbed in the water jacket and in the first heat exchanger and to be recovered in the second heat exchanger through the engine cooling liquid, the first heat exchanger and the second heat exchanger being located on the upper side of the engine body, and the engine cooling liquid inlet of the first heat exchanger being communicated directly with the enging cooling liquid outlet of the water jacket, the engine cooling liquid inlet of the second heat exchanger being communicated directly with the engine cooling liquid outlet of the first heat exchanger, and the engine cooling liquid outlet of the second heat exchanger being communicated with the engine cooling inlet of the water jacket.

2. In a waste heat recovery system for a horizontal liquid-cooled internal combustion engine as defined in claim 1, wherein a first shell for the conduction of the engine cooling liquid in the first heat exchanger and a second shell for the conduction of the engine cooling liquid in the second heat exchanger are formed integrally by one casing for the conduction of the engine cooling liquid.

3. In a waste heat recovery system for a horizontal liquid-cooled internal combustion engine as defined in claim 1, wherein a first shell for the conduction of the engine cooling liquid in the first heat exchanger and a second shell for the conduction of the engine cooling liquid in the second heat exchanger are formed separately, and these both shells are connected directly to each other through pipe couplings.

4. In a waste heat recovery system for a horizontal liquid-cooled internal combustion engine as defined in claim 1, wherein the first heat exchanger includes a portion of a passage extending from a combustion chamber within the engine body to a muffler, and the muffler is located on the upper side of the engine body.

5. In a waste heat recovery system for a horizontal liquid-cooled internal combustion engine as defined in claim 4, wherein the muffler is located at nearly the same height as the first heat exchanger and the second heat exchanger.

6. In a waste heat recovery system for a horizontal liquid-cooled internal combustion engine as defined in claim 1, wherein a bottom frame of the first heat exchanger is provided with an engine cooling liquid inlet passage, an l-shaped exhaust gas inlet passage and an l-shaped exhaust gas outlet passage, and an exhaust gas passage for the heat exchange in the first heat exchanger is formed in such a manner as extending in the horizontal direction.

* * * * *